US012719209B2

(12) United States Patent
Dobler

(10) Patent No.: US 12,719,209 B2
(45) Date of Patent: Aug. 25, 2026

(54) PLUG CONNECTOR HAVING SOCKET WITH ACTUATING TONGUE ARRANGED AT REARMOST END OF ACTUATING ELEMENT

(71) Applicant: Neutrik AG, Schaaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 230 days.

(21) Appl. No.: 18/566,158

(22) PCT Filed: Jun. 23, 2022

(86) PCT No.: PCT/EP2022/067144
§ 371 (c)(1),
(2) Date: Dec. 1, 2023

(87) PCT Pub. No.: WO2023/285098
PCT Pub. Date: Jan. 19, 2023

(65) Prior Publication Data

US 2024/0250474 A1 Jul. 25, 2024

(30) Foreign Application Priority Data

Jul. 12, 2021 (AT) .............................. A 50569/2021

(51) Int. Cl.
*H01R 13/627* (2006.01)
*H01R 13/447* (2006.01)
(Continued)

(52) U.S. Cl.
CPC ....... *H01R 13/6275* (2013.01); *H01R 13/447* (2013.01); *H01R 13/5219* (2013.01); *H01R 24/64* (2013.01)

(58) Field of Classification Search
CPC .............. H01R 13/6275; H01R 13/447; H01R 13/5219; H01R 24/64; H01R 13/6335; H01R 13/516; H01R 13/5213
See application file for complete search history.

(56) References Cited

U.S. PATENT DOCUMENTS 5,588,853 A * 12/1996 Anthony ............ H01R 13/5213 220/375
7,534,125 B1 5/2009 Schroll
(Continued)

FOREIGN PATENT DOCUMENTS

AT 399427 B 5/1995
CN 204516967 U 7/2015
(Continued)

*Primary Examiner* — Edwin A. Leon
(74) *Attorney, Agent, or Firm* — Volpe Koenig

(57) ABSTRACT

An electrical connector, in particular a socket, having a housing (1) in which a first insertion opening (2) is formed, at least one contact carrier (15) for at least one electrical contact element (17), and a locking assembly (25, 26) for an inserted complementary connector. A locking arm (25) can be kept out of engagement with the complementary connector by an actuating element (26) which, starting from a passive position, can be moved manually into an active position. For the shortest possible design of the connector, the actuating part (32) is positioned at the outermost rear end of the actuating element (26) and no part of the actuating element (26) projects rearwardly over it.

13 Claims, 7 Drawing Sheets

(51) Int. Cl.
*H01R 13/52* (2006.01)
*H01R 24/64* (2011.01)

(56) References Cited

U.S. PATENT DOCUMENTS

| | | | | |
|---|---|---|---|---|
| 2011/0136366 | A1 | 6/2011 | Hwang | |
| 2022/0311175 | A1* | 9/2022 | Dobler | H01R 13/748 |
| 2022/0376430 | A1* | 11/2022 | Jutz | H01R 13/5202 |

FOREIGN PATENT DOCUMENTS

| | | | |
|---|---|---|---|
| CN | 205752771 | U | 11/2016 |
| DE | 102013008264 | A1 | 11/2014 |
| EP | 1972037 | B1 | 5/2010 |
| EP | 3819999 | A1 | 5/2021 |
| WO | 2021058129 | A1 | 4/2021 |

* cited by examiner

PLUG CONNECTOR HAVING SOCKET WITH ACTUATING TONGUE ARRANGED AT REARMOST END OF ACTUATING ELEMENT

CROSS-REFERENCE TO RELATED APPLICATIONS

This application is a 371 National Phase of PCT/EP2022/067144, filed Jun. 23, 2022, which claims priority to Austrian Patent Application No. 50569/2021, filed Jul. 12, 2021, both of which are incorporated herein by reference as if fully set forth.

TECHNICAL FIELD

The invention relates to an electrical connector.

BACKGROUND

A typical example of such connectors is described in EP 1972037 B1 in the form of a plug socket, also called a chassis-type socket, as provided for making an electrical plug connection with a complementary connector, in particular a cable connector. On the one hand, the plug socket has electrical contact elements for making an electrical plug connection in XLR design, as they are particularly common for audio applications and are standardized accordingly. However, any other embodiment can also be realized, from jack plugs to data plugs, such as RJ45 connections. To enable insertion of the cable connector, the housing of the plug socket has a corresponding insertion opening into which a complementary connector can be inserted in the direction of an insertion axis. The electrical contact elements are mounted in at least one contact carrier.

As already explained in AT 399 427 B, such plug sockets can have a locking device for the inserted complementary cable connector in order to secure it against unintentional withdrawal. There is at least one elastically deflectable locking arm with, for example, a locking projection which, when the cable connector is inserted, engages in, for example, an opening, undercut or similar catch on the cable connector By means of an actuating element which is manually displaceable from a passive position into an active position in which it engages the locking arm and holds it in external engagement with the complementary locking structure, the locking can be released in order to release the plug connection.

US 2011136366 A1 discloses an electrical connector having a locking mechanism for a mating connector. The locking mechanism consists of two parts, wherein a locking arm has two pointed projections at its end, which engage in recesses on the mating plug, and wherein an actuating element for unlocking is linearly displaceably mounted in a recess in the housing. When the substantially flat actuating element is displaced, its flat end portion is pressed against a slope of the first locking arm, causing the latter to be raised and the projections to be lifted out of the recesses. The plug connection is thus unlocked.

Similarly, U.S. Pat. No. 7,534,125 B1 also discloses a two-part locking mechanism. Again, a locking arm has two pointed projections which engage in recesses of the mating connector. Also again, a substantially flat actuating element for unlocking is linearly displaceably guided in a housing recess. The flat end of the actuating element, when moved longitudinally into the active position, interacts with an inclined surface on the locking arm to raise it and thereby bring the locking projections into external engagement with the mating connector.

SUMMARY

It was the object of the present invention to overcome the disadvantages of the prior art and to create a device that requires less installation space, in particular allowing shorter housing dimensions in the insertion direction, while at the same time increasing functional reliability and simplifying manufacture.

This object is accomplished by a device having one or more of the features disclosed herein. Further optional features are defined below in the claims and disclosed in the description and the figures.

To solve this object, the device according to the invention is characterized in that the actuating section is formed by at least one tongue which is bent around a bending axis oriented parallel to the longitudinal axis of the actuating element and/or the insertion axis and is arranged at the outermost rear end of the actuating element and is not projected rearwardly by any section of the actuating element. The rear edge of the actuating element thereby forms the rear end face of the actuating element. Compared to previous designs, in which the area actually active for unlocking is located in front of the rear end of the actuating element, this enables a much shorter design of the actuating element and thus also of the entire housing in which the actuating element is slidably mounted.

The actuating section formed by at least one tongue can be easily manufactured by punching and bending, wherein the open shape of the rear end of this actuating element can prevent the individual components from catching on each other in the bulk material container of the production line. Moreover, this design contributes to increased functional reliability and operating quality, since deviations of the bending angle when bending about an axis parallel to the axis of relative displacement of the actuating element and locking arm have less effect on the radial dimension of the actuating element than deviations when bending about an axis transverse to the relative displacement, as is the case with conventional actuating elements with their tongues oriented and bent along this direction of relative displacement.

To ensure that the actuating element and locking arm slide on more smoothly, the actuating section has a bevel on its rear side. This also results in a material-friendly design, which also contributes to high functional reliability by avoiding scratches, grooves or the like.

Preferably, for a good leverage ratio during the unlocking process, an arrangement is provided in which the unlocking surface on the locking arm is arranged in its rear section. In this way, the unlocking element can be kept relatively small structurally and the amount of movement required for unlocking can also be kept small, which overall also contributes to a reduction in the size of the housing.

This aforementioned advantage is particularly enhanced in a preferred embodiment of the invention in which the unlocking surface is not projected rearwardly by any section of the locking arm.

An advantageous embodiment of the invention further provides that the actuating element is mounted in a recess of the contact carrier so as to be displaceable parallel to the insertion axis. On the one hand, this ensures functional reliability by providing optimum guidance for the displacement of the actuating element between the passive position and the active position, and on the other hand, the actuating element is located closer to the center of the housing, which results in the smallest possible size.

A further embodiment of a connector according to the invention is characterized in that the actuating element (26) has a cross-sectional enlargement and/or a corresponding cross-sectional reduction is arranged on the housing in the displacement path of the actuating element from its passive position to the active position, wherein the working path of the actuating element from the passive position to the active position is thereby limited and smaller than the path of the actuating section from its position in the passive position to passing over the rear limit of the locking arm. This reliably prevents the actuating section from getting behind the end of the locking arm, springing back into or almost into its initial position, and thus the locking arm and actuating element becoming inextricably hooked and remaining fixed in this position.

A connector according to the invention can further be characterized in that a cover and a second, oppositely oriented insertion opening for a further connector are arranged on the side opposite the first insertion opening and are preferably also equipped with a locking arrangement. It is understood that the use of a locking arrangement of the design described so far is particularly preferred, since this ensures the smallest possible overall length of such a cable connector coupler for connecting cables with similar cable connectors.

For conventional connectors, in particular in the manner of a plug or chassis-type socket, according to another feature of the invention, the inner length of the housing corresponds to the length of the locking arm parallel to the insertion axis. This makes the minimum possible housing dimension possible and allows to provide plug sockets with a very small overall depth, which for applications such as video walls or very flat devices allows a further reduction of their overall depth.

This advantage is further enhanced if, for these applications, a further socket is required at the rear of the connector according to the invention, and provision is made for the insertion axis of the second insertion opening to be oriented transversely to the insertion axis of the first insertion opening.

Advantageously, at least one preferably electrically conductive component is anchored to the housing and/or the contact carrier, which extends to the cover and is mechanically and preferably also electrically conductively connected to it. In addition to the ground connection between the two insertion openings, this structure simultaneously ensures the mechanical cohesion of the entire arrangement of the plug socket.

Preferably, the connectors according to the invention are designed in such a way that at least one of the insertion openings and their contact carriers and electrical contact elements is designed for connection to a data connector, preferably an RJ45 connector.

BRIEF DESCRIPTION OF THE DRAWINGS

For a better understanding of the invention, it is explained in more detail with reference to the following figures.

The drawings show the following in each case in highly simplified, schematic representation.

DETAILED DESCRIPTION

By way of introduction, it should be noted that in the differently described embodiments, the same parts are provided with the same reference signs or the same component designations, wherein the disclosures contained in the entire description can be transferred mutatis mutandis to the same parts with the same reference signs or the same component designations. Also, the positional indications selected in the description, such as top, bottom, side, etc., are related to the directly described as well as depicted figure, and these positional indications are to be transferred mutatis mutandis to the new position in the event of a change of position. In particular, the indication "front" is to be understood here in such a way that this is the side of the plug socket, the housing or all installed components which are closer to the insertion opening. Accordingly, the position designation "rear" means a position opposite to the insertion opening.

Figure 1:
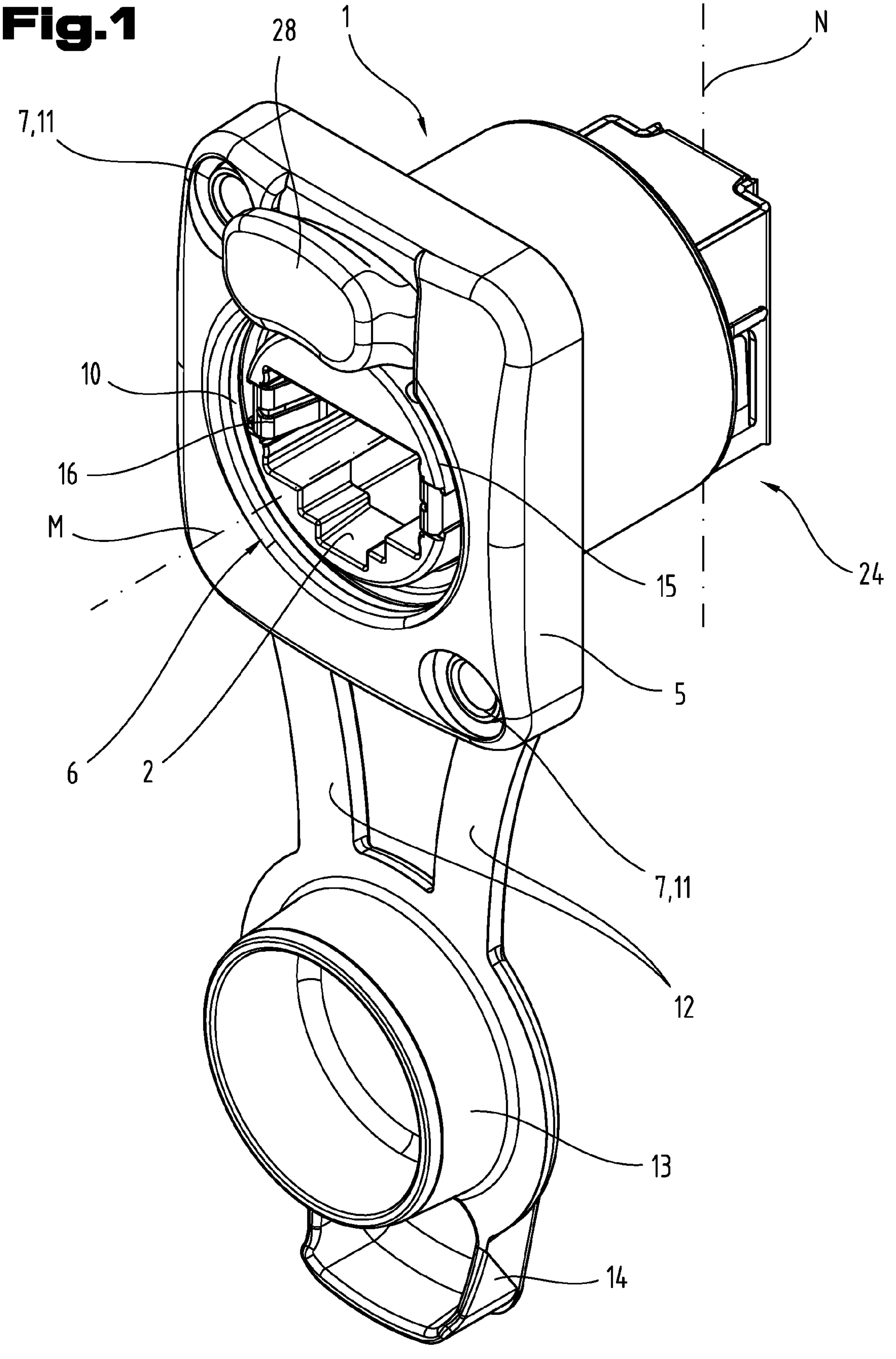
FIG. 1 shows a preferred embodiment of a plug socket according to the invention in perspective view.

FIG. 1 shows an example of a first embodiment of a flush-type connector according to the invention in the form of a chassis-type socket for a data connector, in particular an RJ45 data connector, in perspective view. It is understood that the structure according to the invention can also be applied to other types of flush-type connectors or couplers. Thus, the solution according to the invention can also be used for connectors according to the XLR standard, for jack plugs, for fiberoptic plugs, for combinations of such systems or the like.

Figure 2:
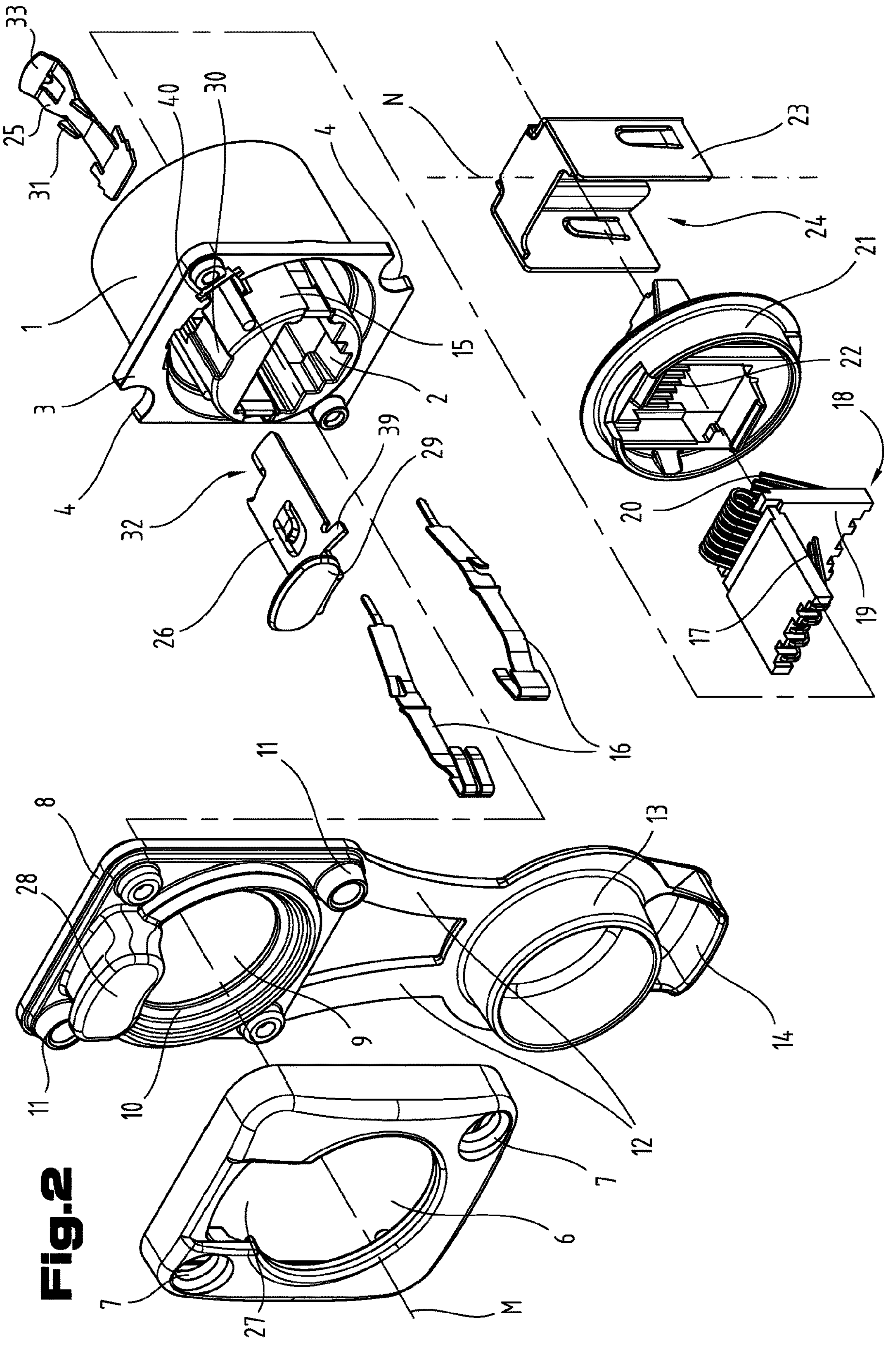
FIG. 2 shows an exploded view of the plug socket in FIG. 1.

The electrical flush-type connector of FIG. 1, shown in detail in an exploded view in FIG. 2 with all essential components or assemblies, comprises a housing 1 with an insertion opening 2 for a complementary connector (not shown). At the plug-in end, at the front of the housing 1, a projecting connecting flange 3 is provided, which preferably projects at right angles from the housing 1 and preferably over its entire circumference. The connecting flange 3 also has through-holes or partially open recesses 4 through which fastening means, typically fastening screws, rivets or the like, for the flush-type connector can be passed in order to fix it in a device wall G, a control panel or similar elements. The recesses 4 are preferably positioned in two opposite corners of the here rectangular connecting flange 3 with respect to the center axis M of the insertion opening 2. The center axis of the insertion opening 2 preferably also represents the central and longitudinal axis of the housing or of the entire connector. It is understood that other outline shapes of the connecting flange 3 are also possible, for example a circular outline, a polygonal outline, or the like. There may also be through-holes 4 in all corners of the connecting flange 3.

The front side of the connecting flange 3 of the housing 1 faces a plug-in side flange plate 5 in the assembled state of the flush-type connector. This has an insertion opening 6 for the complementary connector in a coaxial arrangement with the insertion opening 2 of the housing 1. Furthermore, mounting holes 7 are worked out in the flange plate 5, positioned coaxially with the recesses 4 in the connecting flange 3 and designed for the passage of the fastening means for the flush-type connector for connection to a device wall, a control panel or the like.

Directly inserted between the flange plate 5 and the connecting flange 3 of the housing 1 and held clamped between these components is a preferably plate-shaped seal 8 for sealing against the device wall, the control panel or the like. This seal 8 has a central cutout 9 which corresponds in size at least to the insertion opening 2 and which is arranged coaxially thereto. Preferably, the central cutout 9 is delimited by a circumferential sealing lip 10, the inner diameter of which is somewhat smaller than that of the insertion openings 2, 6 and which thus projects radially into the insertion openings 2, 6 and, when the complementary connector is inserted, seals the annular gap between the outside of the inserted connector and the insertion openings 2, 6. At the location of the mounting holes 7 of the flange plate 5 or the recesses 4 of the connecting flange 3, through-holes 11 for the fastening elements are also worked out in the seal 8.

In addition to sealing the insertion openings 2, 6 when the complementary connector is inserted by means of the sealing lip 10 of the seal 8, it is also advantageously possible to provide a seal in the unmated state. For this purpose, at least one radially projecting connecting strip 12 is formed on the seal 8. A sealing plug 13 is attached to the outer end of the connecting strips 12, the outer diameter of which corresponds at most to the inner diameter of the insertion openings 2, 6 and which is preferably slightly larger than the inner diameter of the sealing lip 10 of the seal 8 sealing the insertion opening 2. Preferably, the sealing plug 13 is openly pot-shaped. For easier handling of the sealing plug 13, a full-surface or preferably also open pot-shaped grip tab 14 protrudes on the side opposite the connecting strip 12.

The housing 1 preferably integrally forms an inner contact carrier 15 arranged concentrically to the center axis M. If necessary, the contact carrier can also be formed by a separate insertion part fixed in the housing 1 by any retaining arrangements. Ground contacts 16 are typically also held on the contact carrier 15. These are preferably guided up to this cover 23 in an embodiment in which a rear cover 23 is present to define a further insertion opening 24. The cover 23 itself is provided in this case as electrically conductive material and ground contacts 16 and cover 23 are mechanically as well as electrically conductively connected, for example soldered.

However, the contact carrier 15 also accommodates the electrical contact elements 17 which serve to establish the electrically conductive connection with the inserted complementary connector. These contact elements 17 are part of a contact set 18, which still has at least one insulating body 19 made of electrically insulating material in its central section, which fixes the contact elements 17 and their opposite ends, preferably also designed as contact elements 20 to a further connector, in their relative position to one another. In the illustrated embodiment of the plug socket, the contact elements 20 are led back to the outside through a housing cover 21, in particular through a feedthrough opening 22 common to all contact elements 20 at the rear end of the housing 1. A cover 23, preferably made of metal, optionally also of plastic material, is placed on the rear side of the housing cover 21 and forms a protection for the contact elements 20 and a further plug socket, the insertion opening 24 of which is oriented transversely to the center axis M of the housing 1, as illustrated by the insertion axis N extending transversely to this center or insertion axis M. However, the contact elements 17 can also be guided through the housing cover 21 to a printed circuit board to or in which they are soldered.

Finally, a locking arrangement 25, 26 is also positioned in or on the housing 1, the at least one locking arm 25 of which can also be unlocked again by means of an actuating element 26. This actuating element 26, preferably a stamped and bent part, with preferably a flat or slightly curved central piece, projects forward beyond the insertion end of the housing 1 so that it can be easily reached and actuated by the user. At the point where the actuating element 26 is arranged, a radially outwardly facing recess 27 extends from the insertion opening 2 of the housing 1 and also from the insertion opening 6 of the flange plate 5, through which the actuating element 26 can project onto the front side of the flange plate 5. In this connection, the seal 8 has an advantageously integrally formed dome 28 into which the actuating element 26 extends, preferably with a manually easy-to-handle operating tab 29 which, in the exemplary embodiment shown, is at right angles to the center axis M of the housing 1 and also to the longitudinal axis O of the actuating element 26 and is bent about an axis P oriented transversely to the center axis M of the housing 1 and also to the longitudinal axis O of the actuating element 26 (see FIGS. 6 to 9).

Figure 10:
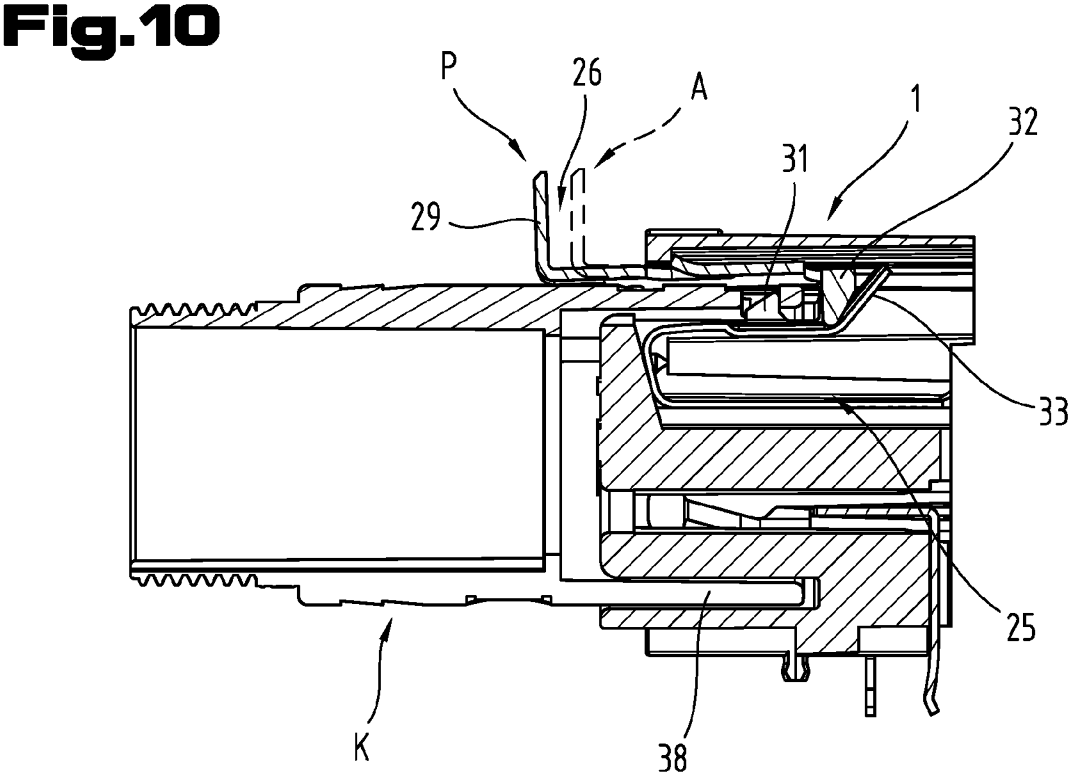
FIG. 10 shows a longitudinal section through an embodiment of a plug socket according to the invention and its locking arrangement in locked position, with inserted cable connector.

An elastic locking arm 25 is mounted on the contact carrier 15, preferably fixed in an elongated recess 30 on the upper side, which locking arm 25 has at least one locking structure on its side facing away from the central longitudinal axis M of the housing 1, in this case in the form of two locking projections 31 bent up at the outer edge of the flat locking arm 25 and shaped like a nose in the side view. With these locking projections 31, the locking arm 25 engages in the inserted state of a complementary connector K inserted into the insertion opening 2 in corresponding complementary locking structures of this connector K, preferably in at least one locking recess in a bushing-shaped insertion section 38 of this connector, and thereby secures the latter against inadvertent or unintentional withdrawal from the insertion opening 2, as can be seen in FIG. 10. In order to enable or facilitate snapping of the locking projections 31 into the locking recess when the complementary connector is inserted, these projections have a guide bevel in a known manner. The locking arm 25, which extends substantially straight over a large part of its length and is preferably made of metal, extends in the shown exemplary embodiment starting from its attachment point in the front region of the contact carrier 15, closer to the insertion opening 2, in the direction of the rear end of the housing 1. Instead, it could also extend in the direction of the insertion opening 2. Other shapes for the locking arm 25 are also possible, for example the U-shaped bent shape shown in FIGS. 10 and 11, in which a straight leg of the U-shaped locking arm 25 rests on and is supported by the contact carrier 15. The other leg adjoining the bent section of the locking arm 25 lying at the front with the locking projections 31 is bent backwards by 180 degrees.

In order to bring the locking arm 25 out of engagement with the locking structure of the plugged-in connector K and to release it for withdrawal from the insertion opening 2, the actuating element 26 can be displaced backwards parallel to the longitudinal center axis M of the housing 1 and of the contact carrier 15 into an active position, starting from a passive position shown in the drawing figures, in which it protrudes at most forwards beyond the housing 1. For this purpose, the actuating element 26 is displaceably mounted on the contact carrier 15, preferably above the locking arm 25 and preferably also in the recess 30 of the contact carrier 15, so as to ensure optimum guidance of the locking arm 25 and actuating element 26 relative to one another.

When the actuating element 26 is displaced from the passive position to the active position, an actuating section 32 on the actuating element 26 acts on preferably an inclined surface 33 as the unlocking surface of the locking arm 25 and bends the latter in the direction of the central center axis M of the housing 1 and of the contact carrier 15, as a result of which the locking projections 31 come out of engagement with the locking structure in the socket-shaped insertion section 38 of the plugged-in connector K, thereby releasing the latter for withdrawal from the insertion opening 2. Preferably, the inclined surface 33 is located at the end of the locking arm 25 opposite to the insertion opening 2 in any shape of the locking arm 25. When the actuating element 26 is released again by the user, the spring-elastic locking arm 25 moves back to its initial position, also moving the actuating element 26 back to its passive position.

In order to achieve a particularly short design of the actuating element 26 and thus of the entire plug socket, the actuating section 32 is arranged at the outermost rear end of the actuating element 26. As can be seen clearly in FIGS. 4 to 9, the actuating section 32 is not overlapped by any other section of the actuating element 26 towards the rear, i.e. in the direction of its longitudinal axis, in the direction of the longitudinal center axis M of the housing 1 as well as in the direction of the displacement from the passive position to the active position. The rear edge of the actuating section 32 thereby forms, preferably together with its base section on the actuating element 26, the rear end face or front face of the actuating element.

As can be seen in FIGS. 4 to 9, the actuating element 26 has two tabs 39 projecting laterally away from the substantially flat or slightly curved central portion. There could also be such a cross-sectional enlargement or other type of cross-sectional enlargement on only one side. These tabs 39, which are preferably located in the front section closer to the insertion opening 2, or other types of cross-sectional enlargements cooperate with at least one corresponding stop 40 on the housing 1. A cross-sectional reduction corresponding to the stop 40 in the displacement path of the actuating element 26 from its passive position P into the active position A, in which the locking arm 25 is deflected from its locking position, can be formed integrally with the housing 1 or mechanically connected thereto as a separate element.

Figure 11:
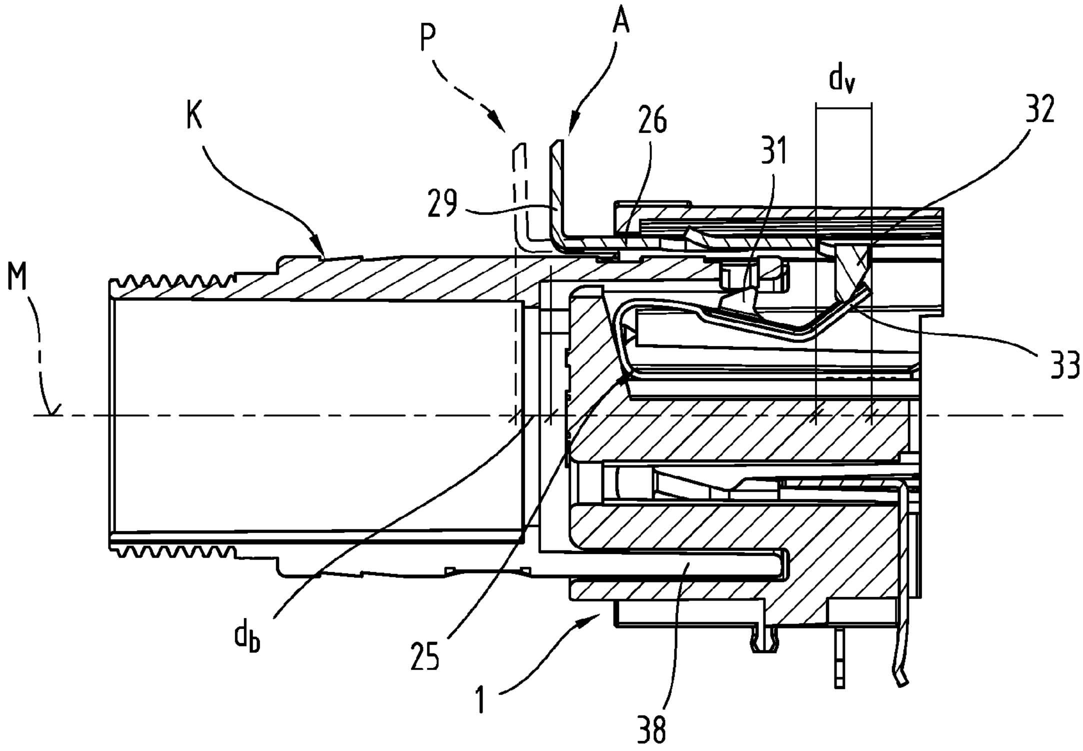
FIG. 11 shows a longitudinal section through the embodiment and arrangement of FIG. 10, in unlocked position.

The advantageous mode of operation of the system of tabs 39 and stops 40 is shown in FIGS. 10 and 11, from which it can be seen that the working travel of the actuating element 26 from the passive position P to the active position A is limited as a result, since further movement in the same direction of movement is prevented by the tab 39 resting against the stop 40. The length of the working travel of the actuating element 26 is denoted by db.

Together with the actuating element 26, its actuating section 32 is also displaced from its position when the actuating element 26 is in the passive position P in the direction towards the active position A. Without limitation, the actuating section 32 could overrun the rear end of the locking arm 25, in particular the rear limitation of the inclined surface 33. The path at which this undesirable condition would occur is denoted by dv. When determining the length of this path, parallel to the longitudinal center axis M of the housing 1, the deflection of the locking arm 25 must of course be taken into account, due to which the rear end is offset somewhat toward the rear side of the housing 1.

In the passive position P of the actuating element 26, the distance between the tab 39 and the stop 40, and thus the working travel db between the passive position P and the active position A, is now selected to be smaller than the travel dv. This reliably prevents the actuating section 32 from getting behind the end of the locking arm 25 and thus remaining undetachably hooked in this position.

The path between the passive position and the active position could also be limited by the fact that the operating tab 29 comes to rest against the front end wall of the housing 1.

According to the preferred embodiment of the invention shown in the drawing figures, the actuating section 32 is formed here by at least one tongue which is bent around a bending axis O oriented parallel to the longitudinal axis O of the actuating element 26 or the longitudinal center axis M of the housing 1. Preferably, this bending axis O lies in the plane of the actuating element 26, coaxial to the longitudinal axis through the flat or slightly curved central portion of the actuating element 26. Preferably, the actuating section 32 has a bevel at its rear end. The rear end of the actuating element 26 is also easy to manufacture due to its open shape, since mechanical or manual effort for separating parts that are hooked together in the bulk material container of the manufacturing plant can be avoided. Furthermore, deviations in the bending angle when bending the actuating section 32 about the longitudinal axis of the actuating element 26. i.e. parallel to the direction of relative displacement of the actuating element 26 and the locking arm 25, have only a minor effect on the radial dimension of the actuating section 32. Thus, even with a larger variation of the bending angles in the production, a deflection of the locking arm 25 always sufficient for unlocking the plug connection is ensured, which leads to reproducible functional safety and operating quality.

The inclined surface 33 on the locking arm 25 is preferably arranged in its rear section in order to be able to keep this component short as well, while still providing sufficient leverage so that it is not necessary to apply too great a force to move the actuating element 26 from the passive position to the active position. Advantageously, therefore, it also applies to the locking arm 25 that the unlocking surface is not projected rearwardly by any section of the locking arm 25. It is also particularly advantageous if the unlocking surface 33 is also not overlapped by any section of the actuating element 26, even if the latter is maximally displaced into the active position.

Instead of having cooperating inclined surfaces on the actuating element 26 and the locking arm 25, only one of these components could have such an inclined surface and the other of these two parts could have a projection cooperating with the inclined surface. A separate spring-elastic element could also be provided to pretension the locking arm 25 toward the locked position and/or another spring-elastic element could be provided to return the actuating member 26 to the passive position when released by the user.

Instead of a spring-elastic design of the locking arm 25, it could also be pivotably mounted on the contact carrier 15 and be loaded by a separate spring element into the position in which it engages in the locking structure of the complementary connector inserted into the housing 1.

In an embodiment as a coupling for two similar connectors, preferably for cable connectors, a connector according to the invention can have a second, oppositely oriented insertion opening for a further connector on the side opposite the first insertion opening, which is likewise equipped with a locking arrangement of the design described so far. In this way, the shortest possible overall length can also be achieved for such couplings.

Figure 3:
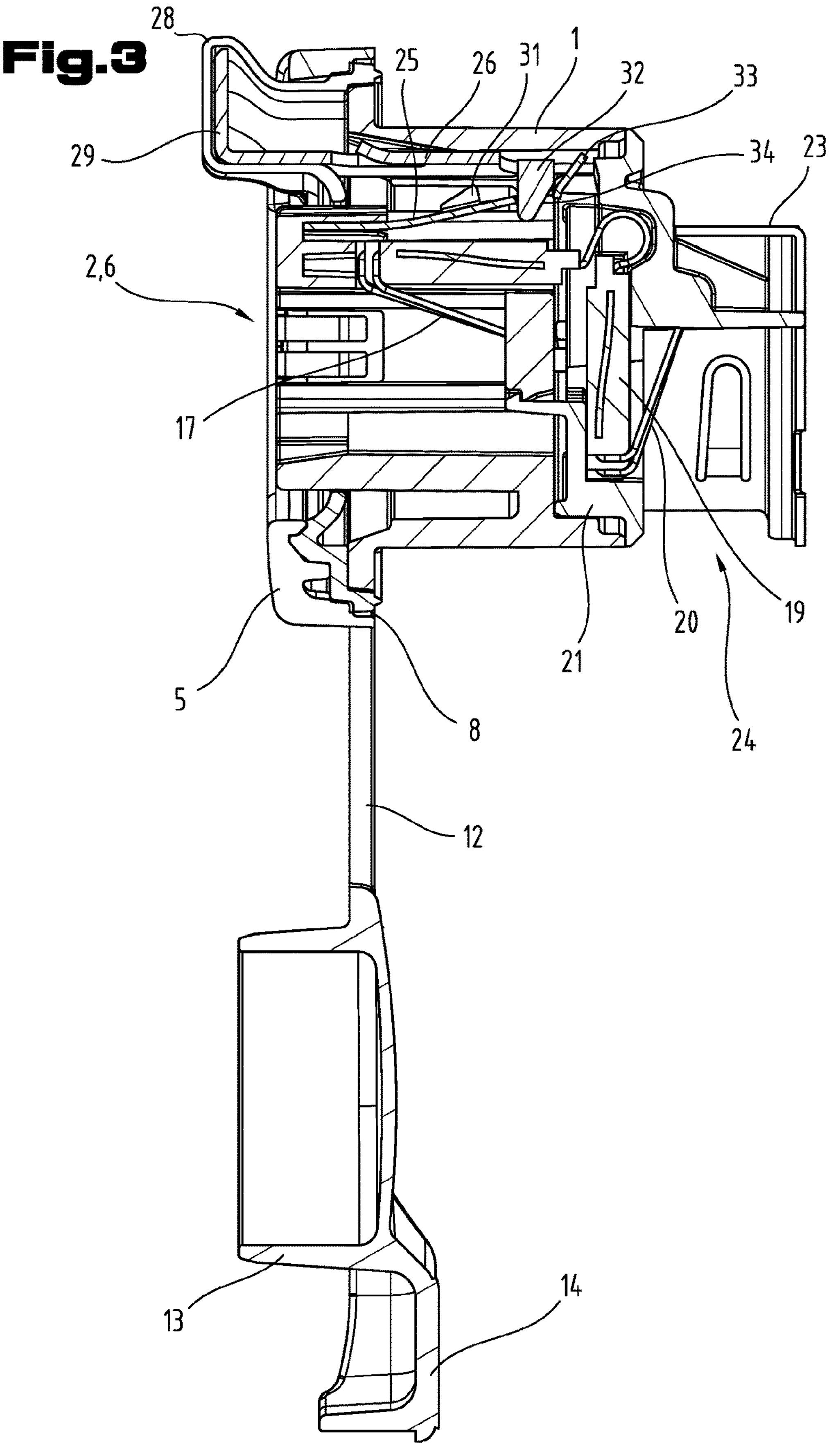
FIG. 3 shows the plug socket of FIG. 1 in a longitudinal section along the vertical center plane.
Figure 4:
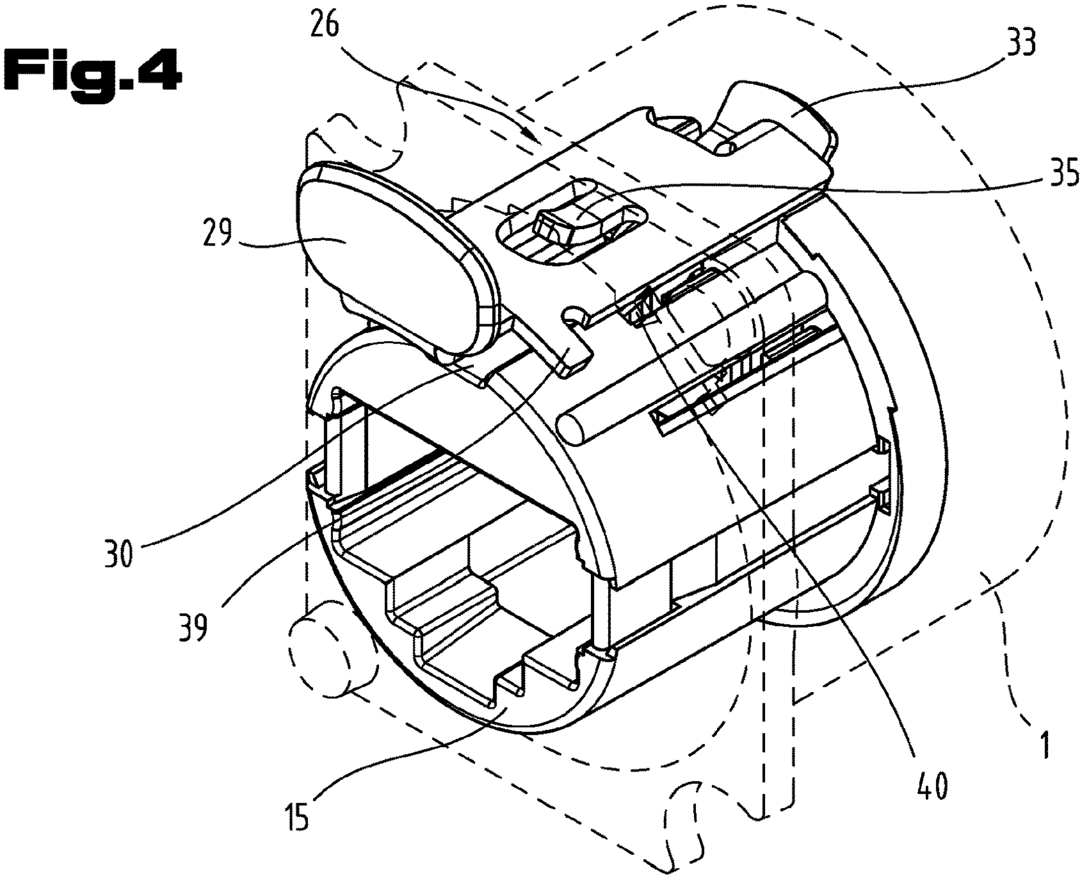
FIG. 4 shows a preferred embodiment of the contact carrier and the actuating element of the locking device of the plug socket of FIG. 1 in perspective view.
Figure 5:
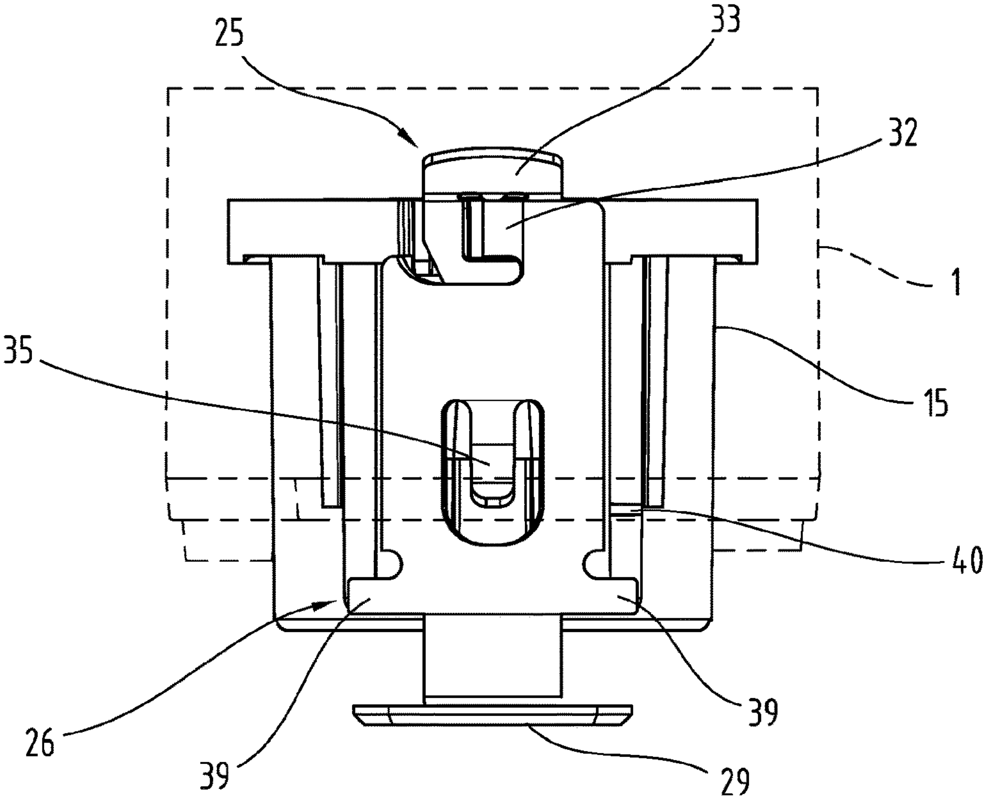
FIG. 5 shows the contact carrier and the actuating element of the locking device of the plug socket of FIG. 1 in a view in the radial direction from above the actuating element.
Figure 6:
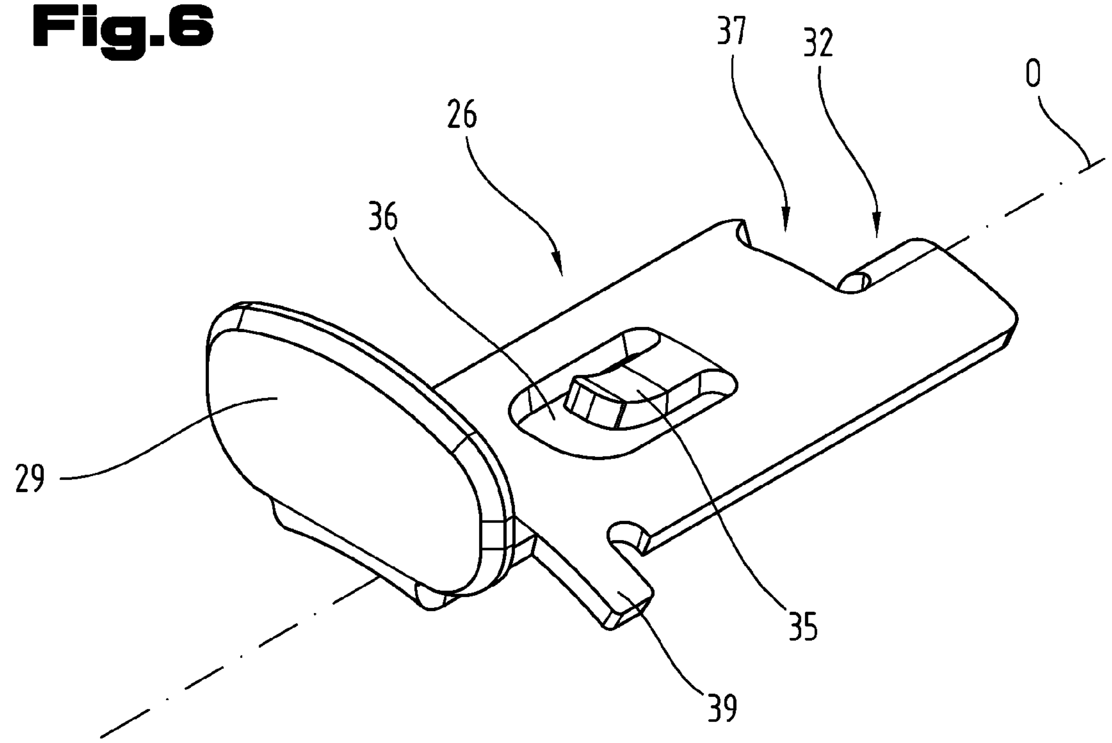
FIG. 6 shows the actuating element of the embodiment of FIGS. 1 to 5 in perspective view from the front.
Figure 7:
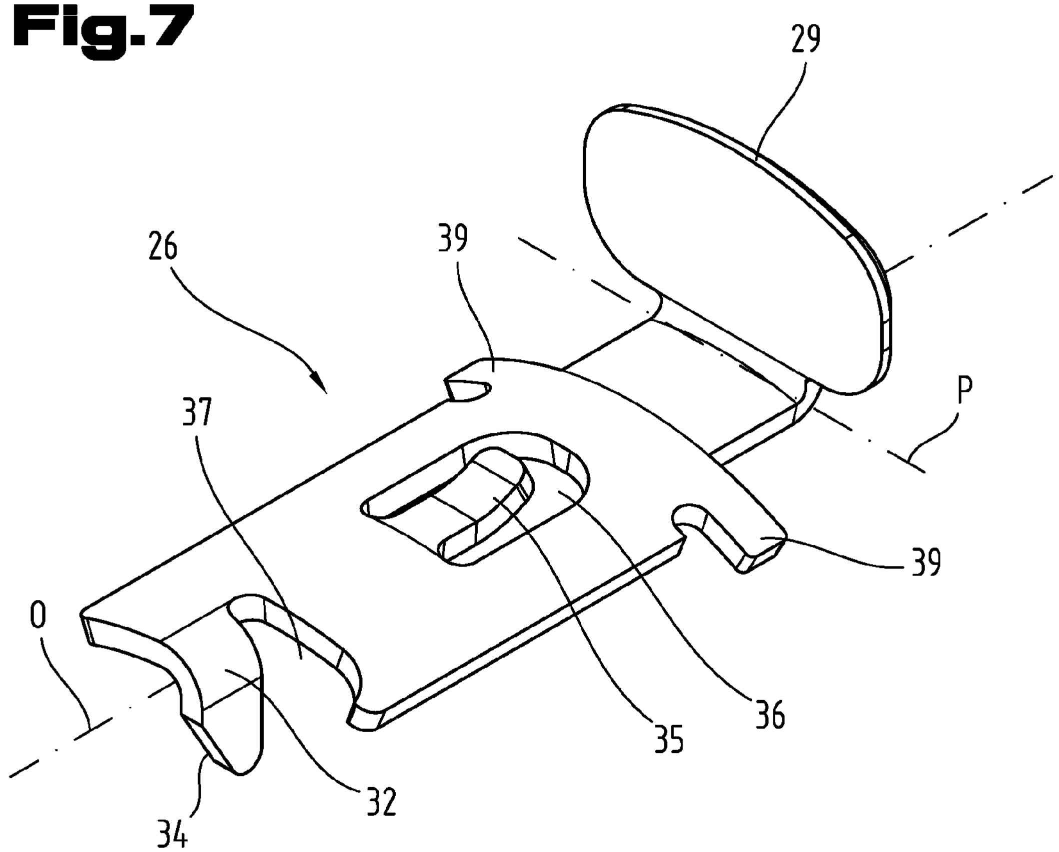
FIG. 7 shows the actuating element of the embodiment of FIGS. 1 to 5 in perspective view from behind.
Figure 8:
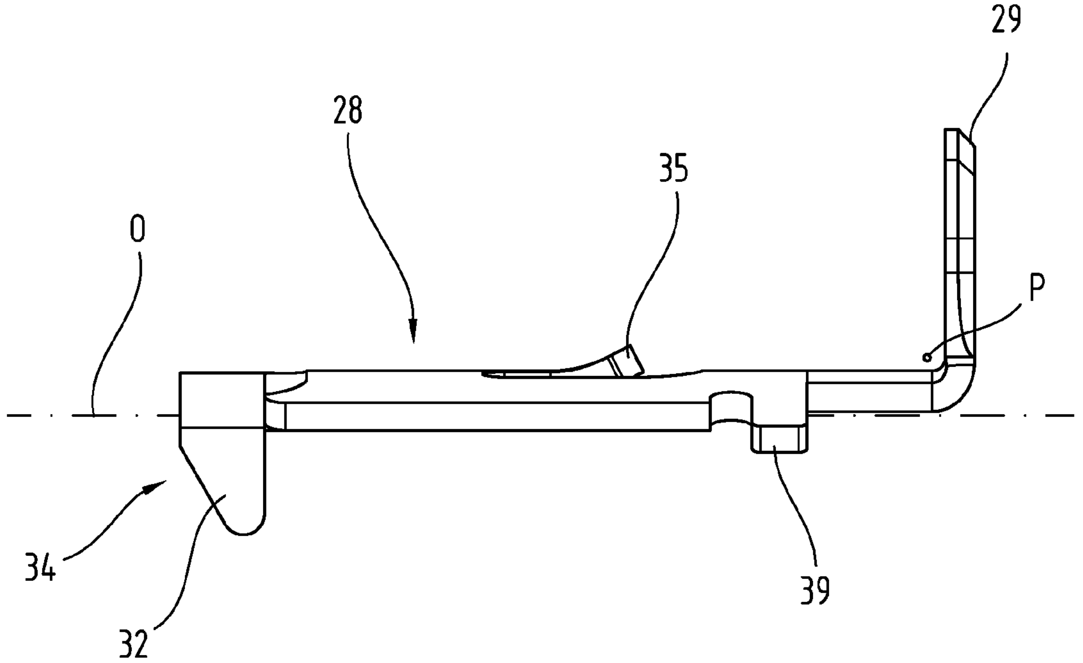
FIG. 8 shows a side view of the actuating element of the embodiment of FIGS. 1 to 5.
Figure 9:
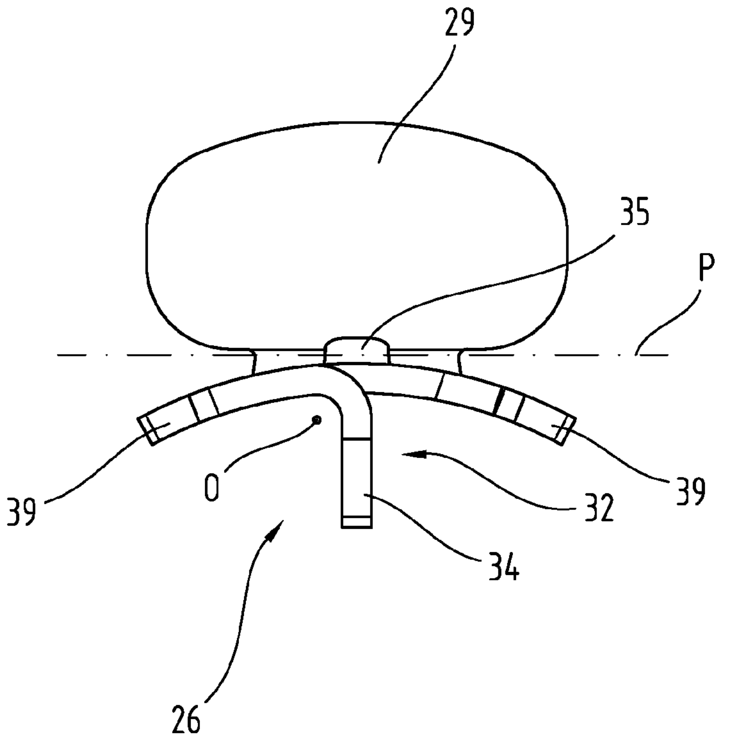
FIG. 9 shows a rear view of the actuating element of the embodiment of FIGS. 1 to 5.

As can be clearly seen in FIG. 3, the housing 1 of a connector in the form of a plug- or chassis-type socket has an inner length up to the rear cover 21 which coincides with the rear end of the locking arm 25 or with the rear end of the actuating element 26 in its maximum active position, in which it is displaced completely towards the rear. This makes it possible to realize substantially shorter housings 1 and thus plug sockets with a very small overall depth in the insertion direction. This applies in particular to the exemplary embodiment shown in FIGS. 1 to 3, in which a further plug socket with an insertion opening 24 is arranged at the rear of the housing 1, the insertion axis N of which is oriented transversely to the longitudinal center axis M of the housing 1 or transversely to the insertion axis of the first insertion opening 2.

In the exemplary embodiment shown, the actuating element 26, which is in the passive position, is secured against further forward displacement in the direction of the insertion opening 2 by a stop element 35 cooperating with the contact carrier 15 and/or the housing 1. Preferably, this stop element 35 is a punched-out tongue extending in the longitudinal direction of the actuating element 26 and bent upwardly out of the plane of the central portion of the actuating element 26 at the front, i.e., lying closer to the insertion opening 2. A clearance cut 36 is provided between the stop element 35 and the flat or slightly curved central portion of the actuating element 26.

In the same way, according to an advantageous embodiment of the actuating element 26, a further clearance cut 37 can also be provided between the flat or slightly curved central piece of the actuating element 26 and the actuating section 32. However, both the actuating section 32 and the stop element 35 can also be machined out of the actuating element 26 without clearance cuts 36, 37, for example by punch cutting.

The exemplary embodiments show possible embodiment variants, wherein it should be noted at this point that the invention is not limited to the specifically depicted embodiment variants thereof, but rather also various combinations of the individual embodiment variants among each other are possible and this variation possibility is due to the teaching for technical action by the present invention in the skill of the person skilled in this technical field.

LIST OF REFERENCE SIGNS

1 Housing
2 Insertion opening
3 Connecting flange
4 Recess
5 Flange plate
6 Insertion opening
7 Mounting hole
8 Seal
9 Cutout
10 Sealing lip
11 Through-hole
12 Connecting strips
13 Sealing plug
14 Grip tab
15 Contact carrier
16 Ground contact
17 Contact element
18 Contact set
19 Insulating body
20 Contact element
21 Housing cover
22 Feedthrough opening
23 Cover
24 Insertion opening
25 Locking arm
26 Actuating element
27 Recess
28 Dome
29 Operating tab
30 Recess
31 Locking projection
32 Actuating section
33 Inclined surface
34 Bevel
35 Stop element
36 Clearance cut
37 Clearance cut
38 Insertion section
39 Tab
40 Stop
M Longitudinal center axis
O Bending axis
K Cable connector
P Passive position
A Active position

The invention claimed is:

1. An electrical connector for producing an electrical plug connection with a complementary connector, the electrical connector comprising:

a housing in which a first insertion opening is formed, into which a complementary connector is adapted to be plugged in a direction of an insertion axis, at least one contact carrier, at least one electrical contact element held in the contact carrier, a locking arrangement for the complementary connector, the locking arrangement comprising at least one elastically deflectable or displaceable locking arm with in each case at least one first locking structure which in a fully inserted state of the complementary connector couples into a second, complementary locking structure of said complementary connector, an actuating element which, starting from a passive position, is manually displaceable into an active position, an actuating section on the actuating element which, in the active position, engages on the locking arm and keeps a locking structure thereof out of engagement with the complementary locking structure, and at least one unlocking surface on the locking arm, on which the actuating section engages in the active position, and the actuating section is formed by at least one tongue which is bent around at least one of a bending axis oriented parallel to a longitudinal axis of the actuating element or the insertion axis and is arranged at an outermost rear end of the actuating element and is not projected rearwardly by any section of the actuating element and thus forms a rear end face of the actuating element.

2. The electrical connector according to claim 1, wherein the actuating section has a bevel (34) on a rear side thereof.

3. The electrical connector according to claim 1, wherein the unlocking surface is arranged on the locking arm in a rear section thereof.

4. The electrical connector according to claim 3, wherein the unlocking surface is not projected rearwardly by any section of the locking arm and/or the actuating element.

5. The electrical connector according to claim 1, wherein the actuating element is displaceably mounted in a recess of the contact carrier parallel to the insertion axis.

6. The electrical connector according to claim 1, wherein the actuating element has at least one of a cross-sectional enlargement or a corresponding cross-sectional reduction arranged on the housing in a displacement path of the actuating element from the passive position into the active position, and the working path of the actuating element from the passive position to the active position (A) is thereby limited and smaller than a path of the actuating section from a position thereof in the passive position to passing over a rear limit of the locking arm.

7. The electrical connector according to claim 1, further comprising a cover and a second, oppositely oriented insertion opening for a further connector arranged on a side opposite the first insertion opening.

8. The electrical connector according to claim 7, wherein an inner length of the housing corresponds to a length of the locking arm parallel to the insertion axis.

9. The electrical connector according to claim 8, wherein an insertion axis of the second insertion opening is oriented transversely to the insertion axis of the first insertion opening.

10. The electrical connector according to claim 7, wherein at least one electrically conductive component is anchored to at least one of the housing or the contact carrier, said electrically conductive component extends up to the cover and is mechanically connected thereto.

11. The electrical connector according to claim 7, wherein at least one of the insertion openings and the contact carrier and the electrical contact elements thereof is adapted for connection to a data connector.

12. The electrical connector according to claim 7, further comprising a second locking arrangement for a second complementary connector that is adapted for insertion in the second, oppositely oriented insertion opening.

13. The electrical connector according to claim 12, wherein the second locking arrangement is constructed identically to the first locking arrangement.

* * * * *